United States Patent
Deimen et al.

[11] Patent Number: 5,971,508
[45] Date of Patent: *Oct. 26, 1999

[54] TABLE WIRE TROUGH

[75] Inventors: Michael L. Deimen, Burleson; Subur Tjandra, Arlington; Erik Nielsen, Euless, all of Tex.; Karl J. Mead, Grand Rapids, Mich.; Robert L. Stewart, Grapevine, Tex.; Thomas F. Crissler; Ting-Wen Nieh, both of Arlington, Tex.

[73] Assignee: Steelcase Inc., Grand Rapids, Mich.

[ * ] Notice: This patent is subject to a terminal disclaimer.

[21] Appl. No.: 08/649,212

[22] Filed: May 17, 1996

[51] Int. Cl.$^6$ ...................................................... A47B 97/00
[52] U.S. Cl. ..................................... 312/223.6; 108/50.02; 248/58; 174/48
[58] Field of Search ............................ 312/223.6, 223.3, 312/223.4, 223.5, 223.1, 246, 194; 108/50.02, 23, 25, 26, 27; 248/58, 63, 68.1, 73; 174/48, 49; 361/832, 826, 827

[56] References Cited

U.S. PATENT DOCUMENTS

| | | |
|---|---|---|
| 3,497,281 | 2/1970 | Wilde . |
| 3,762,116 | 10/1973 | Anderson et al. .......................... 52/239 |
| 4,155,310 | 5/1979 | Gregory . |
| 4,593,505 | 6/1986 | Russell .................................. 174/49 X |
| 4,631,881 | 12/1986 | Charman ................................ 174/48 X |
| 4,654,756 | 3/1987 | Wilson et al. . |
| 4,734,826 | 3/1988 | Wilson et al. ............................ 361/827 |
| 4,792,881 | 12/1988 | Wilson et al. . |
| 4,827,850 | 5/1989 | Diffrient ................................ 108/50 X |
| 4,918,886 | 4/1990 | Benoit et al. ........................... 174/48 X |
| 5,024,167 | 6/1991 | Hayward ..................................... 108/50 |
| 5,024,614 | 6/1991 | Dola et al. ............................. 174/48 X |
| 5,094,174 | 3/1992 | Grund et al. . |
| 5,103,741 | 4/1992 | Grund et al. . |
| 5,144,896 | 9/1992 | Fortsch . |
| 5,231,562 | 7/1993 | Pierce et al. ........................... 108/50 X |
| 5,252,086 | 10/1993 | Russell et al. . |
| 5,381,994 | 1/1995 | Welch ................................... 174/48 X |

FOREIGN PATENT DOCUMENTS

481878  4/1992  European Pat. Off. ............ 312/223.6

*Primary Examiner*—Janet M. Wilkens
*Attorney, Agent, or Firm*—Price, Heneveld, Cooper, Dewitt & Litton

[57] ABSTRACT

A modular wireway which is adapted to be utilized with easily mountable, demountable and remountable attachments includes an elongate member which is mountable to a support surface and at least one connector which is adapted for mating with a connector on a removably attachable cable management trough or a removably attachable modesty panel, or both. The disclosed elongate member has a generally I-shaped transverse cross-section and includes an upper horizontal flange member configured to be mounted on a support bracket secured to a support surface, a web which depends from the upper horizontal flange member, and a lower attachment flange connected to the lower end of the web. The attachment flange includes one or more connectors which allow attachment of one or more removable closures which together with the elongate member define an enclosed raceway, a rigidly connected auxiliary cable management trough, a hingedly connected cable management trough, and/or a modesty panel. The modular wireway invention allows furniture and the like to be quickly and easily configured and reconfigured as desired to provide powerways and auxiliary wireways for communication cables.

30 Claims, 5 Drawing Sheets

TABLE WIRE TROUGH

FIELD OF THE INVENTION

This invention relates to wire troughs and powerways for furniture, and more particularly to a modular powerway adapted to be mounted to a support surface for supporting and housing one or more electrical power receptacles and/or communication receptacles and associated wiring.

BACKGROUND OF THE INVENTION

It is known to provide furniture with raceways adapted to receive cables to allow routing of cables from a worksurface to a wall or floor outlet. It is also known to provide movable wall partitions with raceways adapted to receive electrical powerways. However, the known furniture raceways are generally integrally formed with the furniture, are generally not adapted for receiving an electrical powerway to provide convenient positioning of electrical outlets at desired locations on the furniture, and do not allow separate routing of power and communication cables to provide adequate isolation therebetween. Additionally, the known raceways do not generally allow reconfiguration as desired, and are not adapted to be easily mounted, demounted and remounted as desired to provide a powerway, a communication wireway, or both, as needed. Likewise, partition raceways are generally integrally formed with the partitions and do not generally allow separate routing of power and communication cables, nor do they allow reconfiguration as desired to provide a powerway, a communication wireway, or both, as desired.

SUMMARY OF THE INVENTION

This invention pertains to a modular wireway adapted to be easily mounted, demounted and remounted as desired, and configured and reconfigured as desired to provide a powerway with electrical receptacles, a communication wireway, or both, as desired. The modular wireway or raceway can be easily mounted on generally any support surface, such as the worksurface of a desk or table, and can be easily and conveniently combined with various attachments such as modesty panels and auxiliary cableways or troughs. The various attachments can be easily mounted, demounted and remounted without tools and without fasteners, such as screws or bolts, to provide a level of flexibility and convenience which has not heretofore been provided. In certain configurations, the invention provides a combined electrical powerway and communication cable raceway, wherein voice and data communication cables can be properly isolated from the electrical powerway. The invention may also be used to provide electrical and voice/data connections between a series of linked tables, desks, or the like; whereby a plurality of linked furniture may be powered and/or voice/data wiring may be provided via a single power and/or voice/data feed. The invention also provides a convenient means for concealment of excess appliance cord, communication cord, computer cables, and the like.

DESCRIPTION OF THE PREFERRED EMBODIMENTS

Figure 1:
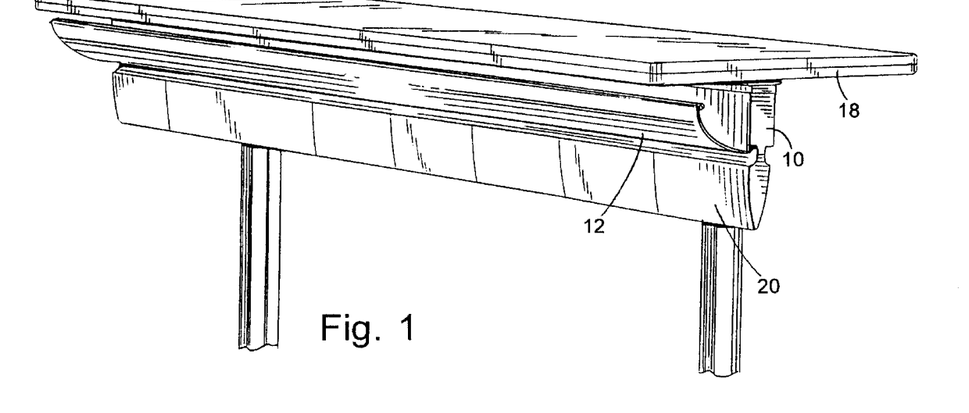
FIG. 1 is a perspective view of a modular wireway mounted to the underside of the worksurface of a table and including an auxiliary cable management trough hingedly connected to a powerway and a dependent modesty panel connected to the powerway.
Figure 2:
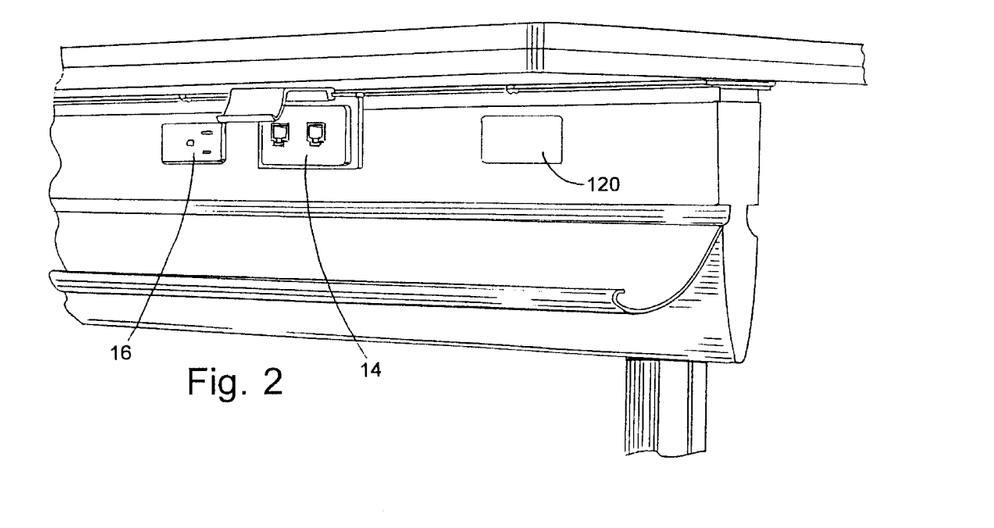
FIG. 2 is a perspective view of the modular wireway shown in FIG. 1, with the hinged trough rotated to the open position.

In FIG. 1, there is shown a first embodiment of the raceway 10 and cable management trough 12 of this invention, with the cable management trough 12 in the raised or closed position to conceal wires, cables, receptacles, etc. FIG. 2 shows the raceway 10 and cable management trough 12 of FIG. 1 with the cable management trough in the lowered or open position to provide access to communication receptacles 14 such as telephone or computer network ports, or the like and/or electrical receptacles 16. The raceway 10 is adapted to be mounted to a variety of support surfaces 18, and is especially intended to be mounted to the underside or top of worksurfaces of furniture, such as desks, tables, counters and the like. The raceway 10 is also specially configured to be used with a variety of different attachments, including cable management troughs 12, which can be either fixed or detachably and hingedly connected to the raceway 10, modesty panels 20, and combinations thereof. The ability of the raceway 10 to be combined with various attachments provides exceptional flexibility and convenience in its application.

Figure 3:
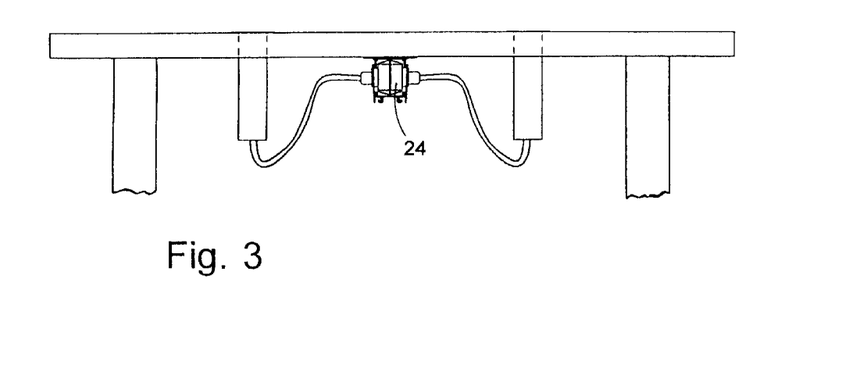
FIG. 3 is a transverse cross-sectional view of a modular wireway in accordance with the invention, configured for use with pop-up grommets.

The raceway 10 can, for example, be used by itself, without attachments (i.e. without auxiliary cable management troughs, wireways, modesty panels, etc.) to provide data ports, electrical outlets or the like adjacent to the underside of a support surface, such as a worksurface of a conference table. Cables, wires or the like may be run from equipment positioned on top of the worksurface to the receptacles on the raceway 10, such as by draping the wire over the edge of the worksurface and running it to the raceway along the underside of the worksurface, or the wires can be run through an opening or grommet in the worksurface, such as through a pop-up grommet as shown in FIG. 3.

Figures 4, 5, 6:
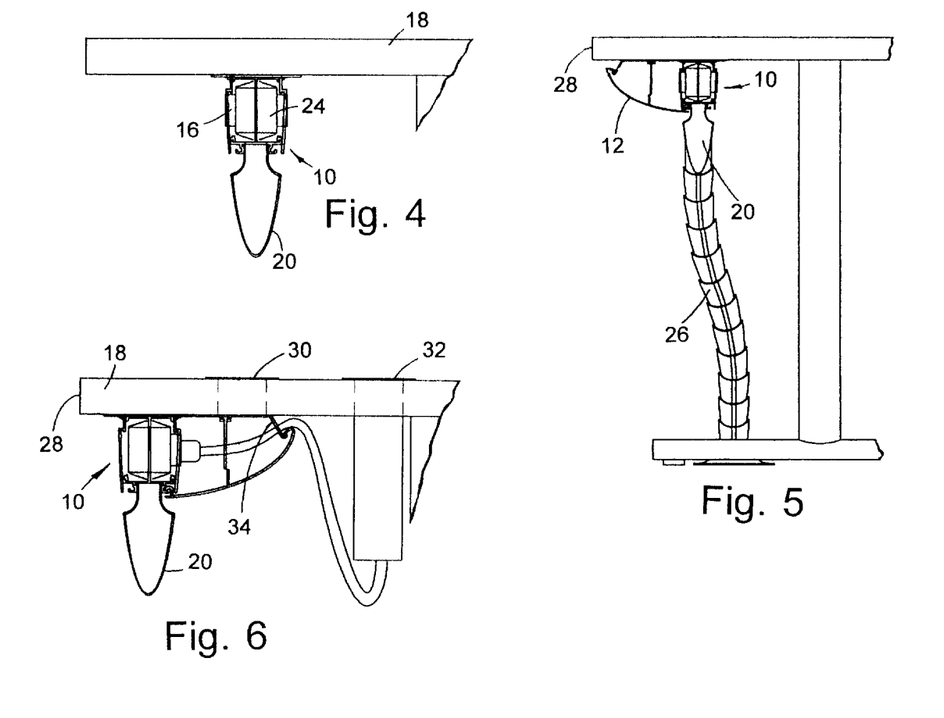
FIG. 4 is a transverse cross-sectional view of a modular wireway in accordance with the invention, having a modesty panel attached thereto.
FIG. 5 is a transverse cross-sectional view of a modular wireway having an attached auxiliary cable management trough and a modesty panel.
FIG. 6 is a transverse cross-sectional view of a modular wireway in accordance with the invention, including an attached auxiliary cable management trough used in association with a standard grommet and a pop-up grommet.

As another example, the raceway 10 can be used with an attachable modesty panel 20 as shown in FIG. 4.

Figure 7:
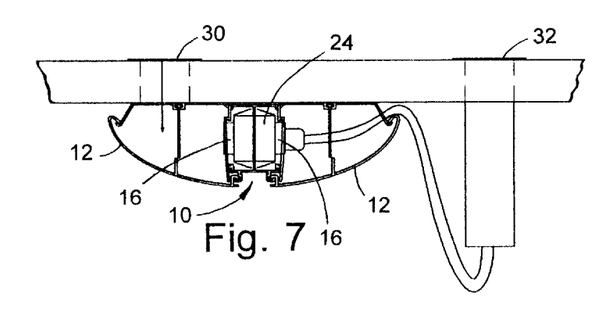
FIG. 7 is a transverse cross-sectional view of a modular wireway in accordance with the invention, including a first cable management trough laterally disposed on one side of the elongate member which is utilized in connection with a standard grommet, and a second auxiliary cable management trough laterally disposed on the opposite side of the wireway and utilized in association with a pop-up grommet.

As another alternative, the raceway 10 can be used with a single attachable cable management trough 12, such as shown in FIGS. 5 and 6, or with two cable management troughs, one attached to each side of the raceway 10, such as shown in FIG. 7. FIG. 5 shows a raceway 10 having a single cable management trough 12, attached thereto a modesty panel 20, and containing one or more power distribution modules 24 having one or more electrical and/or communication receptacles. A flexible conduit 26 through which power and/or communication cables can be run from the floor to the raceway, as shown in FIG. 5. Power and/or communication distribution cables can be supplied to any of the modules 24 shown in the other figures, such as through an aperture in the raceway 10 or, for example, from a wall to the raceways. The arrangement shown in FIG. 5 allows wires to be passed from the upper side of the worksurface 18, around an edge thereof, and downwardly into the cable management trough 12, and to a receptacle 16 on power module 24. FIG. 6 shows an arrangement similar to that of FIG. 5, but with the cable management trough 12 attached to a side of the raceway 10 opposite the side closest to the edge 28 of the worksurface 18. This arrangement can be used, for example, to pass one or more communication and/or power cables from the upper side of the worksurface, through a grommet 30, and to a receptacle on module 24, or, for example, through a pop-up grommet 32, and into trough 12 through a gap between the edge of trough 12 and the underside of the worksurface. FIG. 7 shows an arrangement including raceway 10 and two troughs 12, attached to opposite sides of raceway 10. This arrangement can be used, for example, to pass cables from the upper side of the worksurface through a standard grommet 30, through trough 12, and to a receptacle on module 24; or through pop-up grommet 32, through a gap between the edge of trough 12 and the underside of the worksurface. Obviously, the arrangement shown in FIGS. 3, 6 and 7 can be used with any number of standard grommets 30 and/or any number of pop-up grommets 32. Troughs 12, in any of the illustrated arrangements, can be used for conveniently laying any excess length of cable therein, to minimize the amount of exposed cable above the worksurface, and to eliminate cable from dangling beneath the worksurface, or to minimize the amount of cable which dangles beneath the worksurface.

Figure 8:
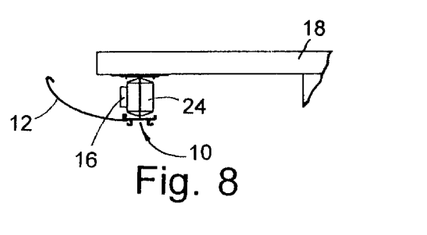
FIG. 8 is a transverse cross-sectional view of a modular wireway in accordance with the invention, having an attached cable management trough extending outwardly beyond the underside of a worksurface to which the wireway is mounted.

FIG. 8 shows another alternative arrangement wherein removable cover plates can be eliminated from the raceway to provide an elongate, generally I-beam shaped member 40 to which a power module 24 and trough 12 are attached. This arrangement allows cables to be draped over an edge of a worksurface and dropped down into trough 12 and run to a receptacle 16. This arrangement may be conveniently used at the rear edge of a table, desk or the like, which is adjacent a wall or partition.

Figure 9:
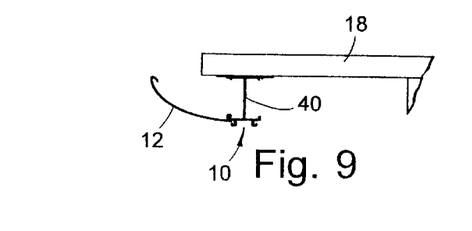
FIG. 9 is a transverse cross-sectional view of a modular wireway similar to that shown in FIG. 8, but which is utilized without power modules or power receptacles.

FIG. 9 illustrates an arrangement which is similar to that shown in FIG. 8, but without any power modules, demonstrating the utility of the invention as a wire chase for conveniently running communication cables and/or stowing excess lengths of cables even when the raceway I-beam shaped member 40 is not used as a powerway.

Figure 10:
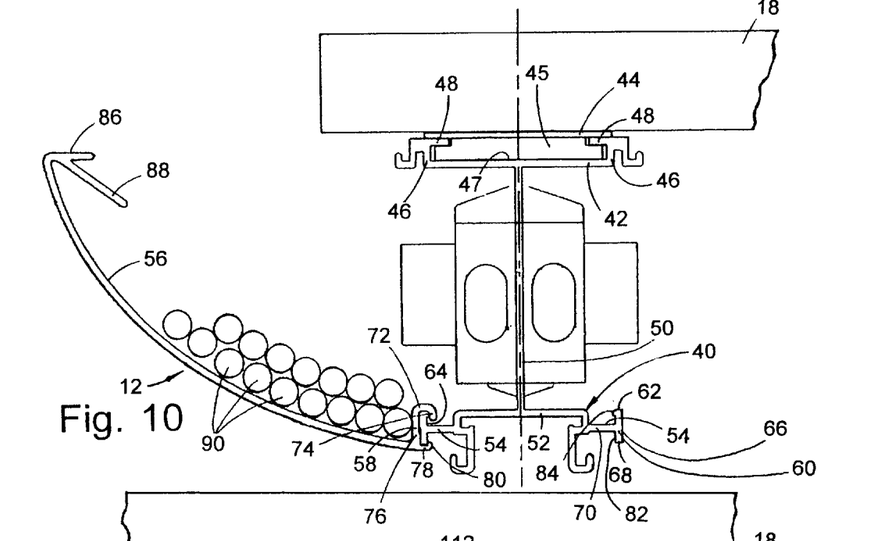
FIG. 10 is an enlarged, detailed cross-sectional view of a modular wireway having a rigidly attached cable management trough laterally disposed on one side thereof.

The powerway of this invention is shown in greater detail in FIG. 10. Powerway 10 is comprised of an elongate, generally I-beam shaped member 40, shown in transverse cross-section in FIG. 10. Elongate member 40 includes an upper mounting flange 42 for attaching member 40 to a support surface. With the illustrated embodiment, elongate member 40 is mounted to the underside of a worksurface by means of brackets 44 and separate, generally T-shaped rails 45. Brackets 44 and rails 45 are held to the underside of worksurface 18 by threaded fasteners. Brackets 44 are preferably secured to the worksurface by a combination of adhesives and the threaded fasteners. Brackets 44 act as reinforcement for the worksurface to prevent the rails from possibly being torn away from the worksurface. There are preferably shouldered slots on the rails 45 which allow the position of the rails to be shifted to allow alignment with adjacent powerways on adjoining worksurfaces. Mounting flange 42 includes a T-shaped channel defined by a horizontal surface 47 of flange 42, first and second upright extensions 46 at opposite sides of flange 42, and horizontal extensions 48 which extend toward each other from upright extensions 46. Bracket 44 can be attached to a worksurface using a variety of fasteners, such as adhesives, screws, etc. Elongate member 40 is easily mounted on rail 45 by merely aligning the T-shaped channel of flange 42 with the T-shaped rail 45 and sliding member 40 onto rail 45. Instead of using an elongate bracket 44, it is also possible to support member 40 in a similar manner using a plurality of short brackets having the same or similar cross-sectional shape as bracket 44. For example, member 40 may be supported using two such brackets, such as one at or near opposing ends of member 40. A variety of alternative techniques or variations of the illustrated means may also be employed to attach member 40 to a support surface. Means which allow member 40 to be easily attached to and removed from the worksurface are preferred. Bracket 44 is preferably made of a relatively strong, durable and rigid material, such as steel. Elongate member 40 can be formed of a variety of different materials, although strong, durable, rigid materials which can be extruded, such as aluminum, or pultruded, such as fiber reinforced resins, are preferred.

Elongate member 40 also includes a vertical web 50 which depends from horizontal mounting flange 42, and a lower attachment support flange 52 connected to the lower end of web 50. Attachment support flange 52 includes connectors 54 for attaching a stationary, or rigidly connected cable management trough 12 or cover door to elongate member 40. Trough 12 is an elongate shelf-like member having a trough-defining wall 56 which curves outwardly away from flange 52 and upwardly toward a horizontal plane, and preferably terminates at a horizontal plane below the upper side of the worksurface, and more preferably terminates at a horizontal plane about even in elevation with the underside of the worksurface, i.e. about even with flange 42. Along the lower edge of trough 12 is a mating connector 58 which is adapted to clip on to, snap on to, or otherwise reversibly connect trough 12 to member 40 by means of mating engagement with connector 54, preferably without requiring any tools or auxiliary fasteners such as screws, bolts, etc. In the illustrated embodiment, connectors 54 are comprised of connector rails 60 having an upper supporting edge 62; an upper, vertical abutment wall surface 64 facing toward web 50; a vertical abutment wall surface 66 facing away from web 50; and a lower edge 68. Connector rails 60 are supported by horizontal webs 70 which generally extend away from opposite sides of attachment support flange 52 to a portion of each of the rails 60 which is between the upper and lower edges 62, 68, respectively.

The mating connector 58 on trough 12 is comprised of an inverted J-shaped hook 72 which hooks onto rail 60. Specifically, the downwardly extending end 74 of hook 72 engages abutment wall surface 64 and upwardly projecting segment 76 engages abutment wall surface 66 to prevent rotation of trough 12 about connector 54; and trough 12 is supported by the upper edge 62 of rail 60 upon which hook 72 bears. In order to enhance the rigidity of the connection, and to facilitate snap-type or snap-on attachment between trough 12 and member 40, trough 12 includes an extension 78 which engages the lower edge 68 of connector 54, and an upwardly projecting tab 80 which engages a lower vertical wall 82 of connector rail 60 facing toward web 70. The upper edge of upper vertical abutment wall 64 includes a longitudinal protuberance 84 which helps ensure a tight snap-connection between connector 54 and mating connector 58.

Along the upper edge of trough 12 is a horizontal flange 86 which extends toward web 50 and a diagonally oriented flange 88 which extends from the underside of flange 86 downwardly and toward web 50. Flanges 86 and 88 help conceal communications cables 90 from view and provide a surface for mounting a latch or fastener.

Figure 11:
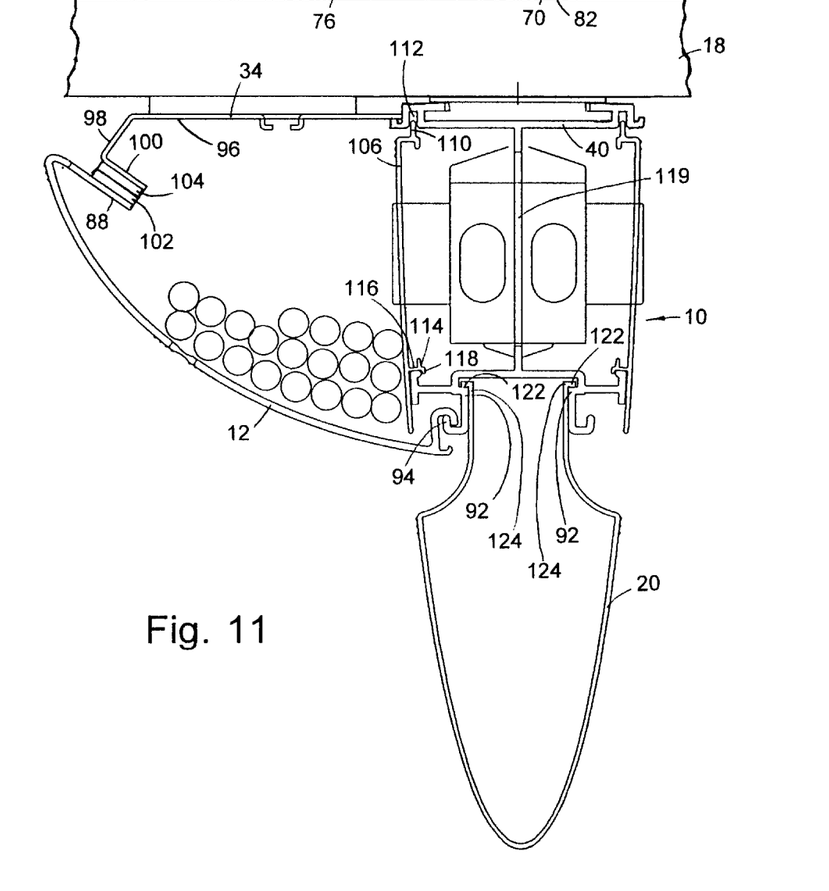
FIG. 11 is an enlarged, detailed transverse cross-sectional view of a modular wireway in accordance with the invention, having attached thereto a hinged cable management trough, a modesty panel, and removable panels which define an enclosed powerway.

With reference to FIG. 11, there is shown a raceway 10 and a cable management trough 12 which is hingedly connected to connector 92 of elongate member 40. Connectors 92 are J-shaped hook connectors which extend downwardly from each side of attachment support flange 52 and which are substantially identical in size and shape to inverted J-shaped hooks 72. Inverted J-shaped hook 72 of trough 12 is merely hooked to J-shaped hook 92 as shown in FIG. 11. The spacing between the opposing vertical wall sections of J-shaped hook 92 is greater than the wall thickness of the downwardly extending end 74 of hook 72, and the spacing between the opposing vertical wall sections of inverted J-shaped hook 72 is greater than the wall thickness of upwardly extending end 94 of hook 92 so that hook 72, and hence trough 12, can be rotated relative to hook 92. However, the spacing between the opposing vertical walls of J-shaped hook 92 and inverted J-shaped hook 72 is sufficiently small to limit rotation of trough 12 to about 30 degrees so that when trough 12 is swung open, cables 90 do not fall out of the trough. A bracket 34 mounted to the underside of support surface 18 is used to hold trough 12 in the raised or closed position shown in FIG. 11. Bracket 34 includes a horizontal section 96 which is attached to support surface 18, a section 98 which slopes downwardly and away from raceway 10 toward the upper end of trough 12, and a section 100 which slopes downwardly and back toward raceway 10. Section 100 is generally parallel with and generally in abutment with flange 88 of trough 12 when trough 12 is in the raised or closed position. Flange 88 and section 100 of bracket 34 are provided with cooperating fastening elements 102, 104 which allow trough 12 to be reversibly retained in the closed position. A preferred fastening means 102, 104 is a hook and loop type (e.g. Velcro®) fastener. For example, fastener element 102 secured to trough 12 can have a surface facing element 104 which includes a multiplicity of filament loops, and element 104 secured to bracket 34 can have a multiplicity of miniature hooks which hook onto the loops on element 102. Various other retention or reversible fastening means can be employed, such as magnets, snap fasteners, etc.

As shown in FIG. 11, raceway 10 is provided with removable closures panels 106 on each side thereof to define an enclosed powerway. Panels 106 can be removably supported on member 40 using any of various retainers or connectors such as hooks, magnets, loop and hook fasteners, etc. In the illustrated embodiment, panel 106 is provided with an upwardly projecting tongue 110 which fits into a groove 112 on upper mounting flange 42 of member 40, and a hook 114 configured to engage connector 54 of attachment support flange 52. Specifically, hook 114 includes a generally horizontal segment 116 which rests upon upper edge 62 of rail 60 and a downwardly extending segment 118 which engages protuberance 84 on the upper edge of upper vertical wall 64. Panels 106 can be supported on member 40, without tools or auxiliary fasteners, by inserting tongue 110 into groove 112, urging the lower end of panel 116 toward connector 54 and allowing hook 114 to snap into place or otherwise engage connector 54, such as by lowering hook 114 over connector 54. Panel 106 can be removed by urging the lower end of panel 106 upwardly and outwardly (i.e. away from web 50), or more preferably by merely pulling the lower end of panel 106 outwardly, and then allowing tongue 110 to slide downwardly from groove 112.

Trough 12 and panels 106 can be made of any suitable material. However, trough 12 and panels 106 are preferably extruded (or possibly pultruded) thermoplastic parts which are strong, durable and lightweight. Panels 106 preferably exhibit sufficient flexibility and resilience to facilitate snap engagement between hook 114 and connector 54. Likewise, trough 12 preferably exhibits sufficient flexibility and resilience to permit snap type engagement between connector 54 and mating connector 58. The various connectors 54, 58, hooks 92, 114, fastening elements 102, 104, tongue 110, groove 112, etc., typically extend along the entire length of the components to which they are integral portions thereof, because they are preferably extruded or pultruded. However, the various components (e.g. member 40, trough 12, panels 106, bracket 34, etc.) can be provided with connectors, hooks, fastening elements, etc. which do not necessarily extend along the entire length of the component. For example, it may be possible to adequately retain trough 12 in the closed position (as shown in FIG. 11) using a plurality of fastener elements 102, 104 which are spaced apart along the length direction of trough 12 and bracket 34.

Bracket 34 can be made of any suitable material, such as steel, aluminum or plastic. Bracket 34 can be attached to support surface 18 using any suitable means such as adhesives, screws, etc.

The web portion 50 of I-beam shaped member 40 is provided with a plurality of uniformly spaced apart apertures 119 (e.g. spaced apart every 12 inches) which are sized and shaped to receive a commercially available power module 24 which can be snapped into place as shown in FIG. 11. The power modules include connector cables with quick connect couplings (not shown) that allow each power module to be connected in series with adjacent power modules and/or a power source. The connector cables can be of various lengths as desired so that any number of modules 24 can be used and spaced apart as desired. Modules 24 include means for connecting receptacles 16 to either or both sides of the raceway 10. The receptacles can include a single or double outlet as desired. Panels 106 are preferably provided with a plurality of knockout panels 120 which can be removed to allow receptacles 16 to pass through the resulting apertures. The knockout panels 120 are preferably provided along the length of panels 106 and are uniformly spaced apart to conform to the spacings between apertures 119.

As shown in FIG. 11, attachment support flange 52 and J-shaped hooks 92 define a connector having a T-shaped channel with support ledges 122 which support modesty panel 20. Specifically, modesty panel 20 includes a mating connector comprised of horizontal support flanges 124 which rest upon ledges 122. Modesty panel 20 can be installed by either aligning flanges 124 with the grooves above ledges 122 which are defined by the T-shaped channel, and sliding panel 20 onto member 40; or by urging flanges 124 toward each other and pushing the upper end of panel 20 into the channel and releasing the force urging flanges 124 together, so that flanges 124 spring outwardly and snap into the grooves above ledges 122. Various alternative connecting means can be provided if desired, although quick connectors which do not require tools or additional fasteners, such as screws, bolts, etc., are preferred. Modesty panel 20 can be made of a variety of suitable materials. However, inexpensive, lightweight, extrudable thermoplastic materials are preferred.

Figure 12:
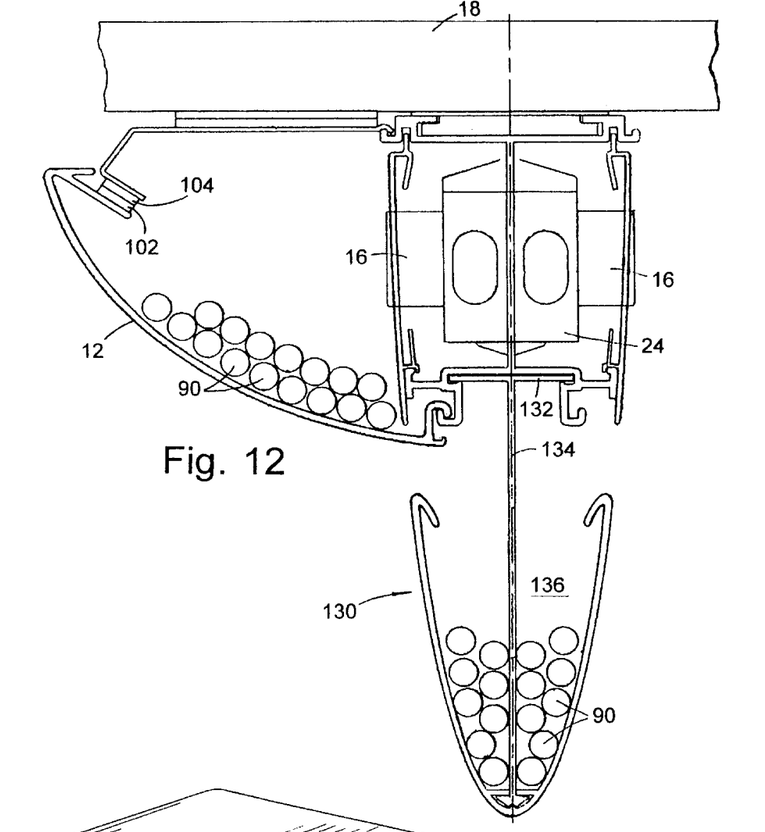
FIG. 12 is an enlarged, detailed transverse cross-sectional view of a modular wireway which is similar to that shown in FIG. 11, but which includes an alternative modesty panel which includes a raceway having a bottom and side walls, with the upper ends of the side walls being vertically spaced from the removable panels of the wireway so that cables can be layed into the raceway.

There is shown in FIG. 12, an arrangement generally comprising elongate member 40, panels 106, trough 12, bracket 34, bracket 44, module 24, receptacles 16, and an alternative modesty panel 130 which serves an addition function as a cable raceway. Modesty panel 130 includes a connector flange 132 adapted to connect with the modesty panel support connector on flange 52 of member 40 and a web 134 connecting flange 132 to raceway 136. Raceway 136 is an elongated member having a generally V-shaped or U-shaped cross-section defining a bottom and side walls, with the upper ends of the side walls being vertically spaced away from the elongate member 40, generally defined by member 40, so that cables can be layed into raceway 136.

Figure 13:
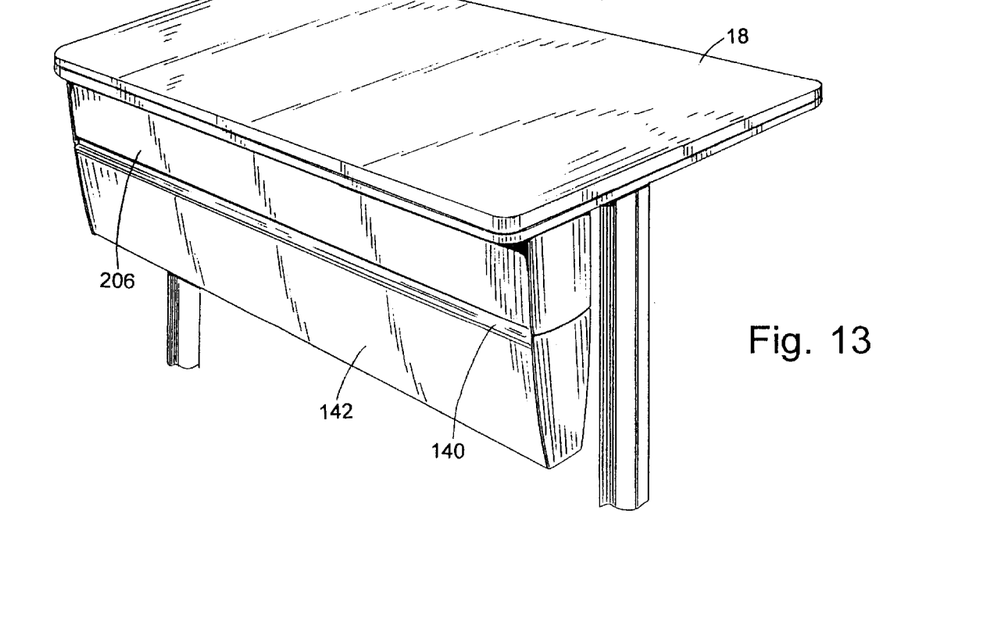
FIG. 13 is a perspective view of an alternative embodiment of the modular wireway and a dependently mounted modesty panel which also acts as an auxiliary raceway.
Figure 14:
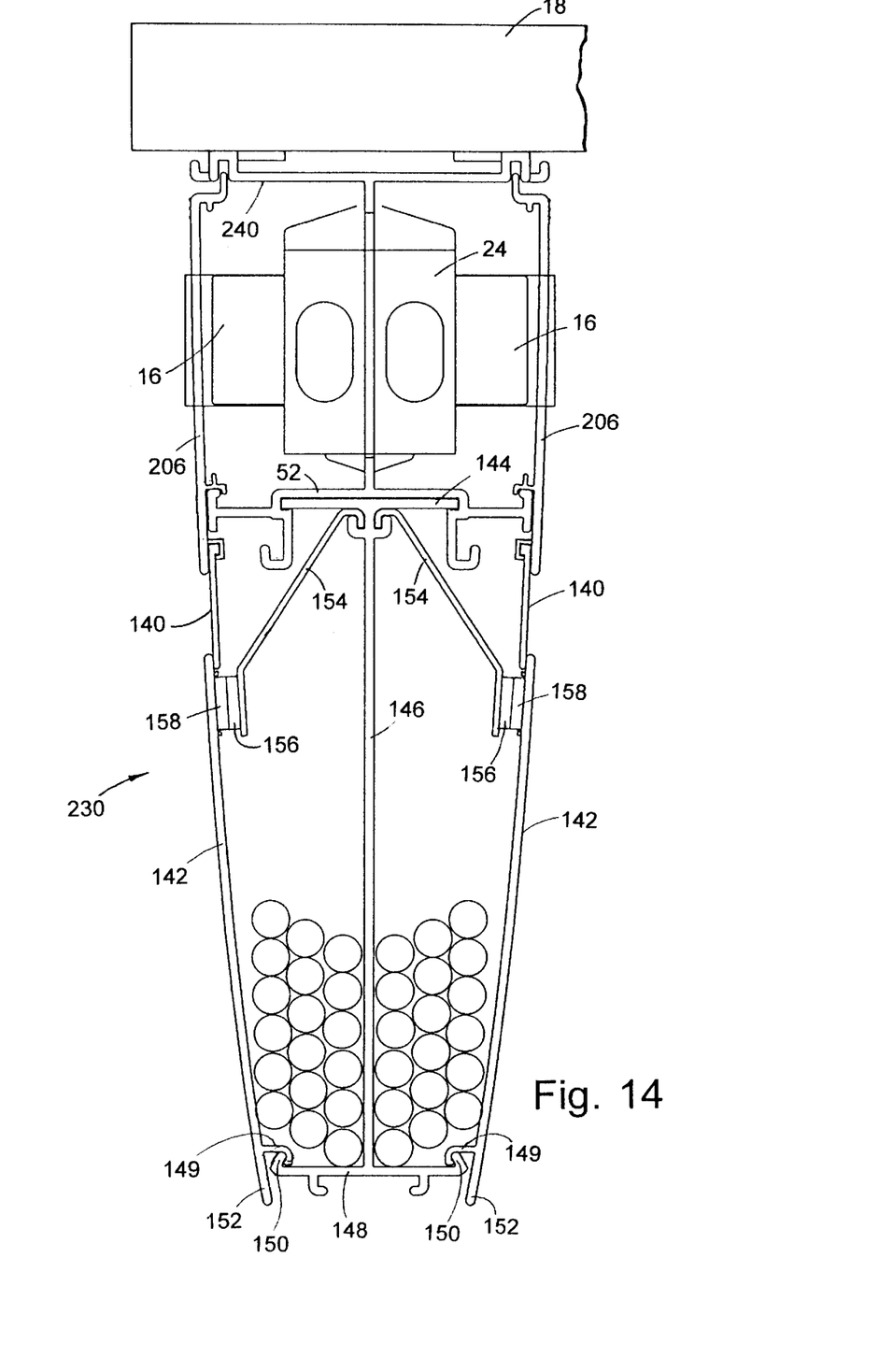
FIG. 14 is a detailed transverse cross-sectional view of the wireway and modesty panel shown in FIG. 13.

FIGS. 13 and 14 show an alternative embodiment of the invention generally comprising an elongate member 240, panels 206, bracket 44, module 24, receptacles 16, and another alternative modesty panel 230 which also functions as a cable raceway. Member 240 is generally similar to member 40, and panels 206 are generally similar to panels 106, except they include a cable access flap 140. Modesty panel 230 is generally similar to modesty panel 130, but differs in one major respect. Namely, modesty panel 230 is provided with access doors 142. Specifically, modesty panel 230 includes a connector flange 144 adapted to connect with the modesty panel support connector on flange 52 of member 240, a web 146 which depends from flange 144, and a lower door mounting flange 148 on which doors 142 are hingedly supported. Flange 148 includes hinge connectors 150 which extend diagonally upwardly and inwardly (toward web 146) from opposite ends of flange 144. Access doors 142 each include an inwardly directed connector or hook 149 near the lower end of the door which engages connectors 150 to detachably and hingedly support doors 142 on flange 144, without the use of tools or auxiliary fasteners. The lower end 152 of doors 142 extend below hooks 149 and engage the corners at the intersection of flange 148 and connectors 150, which act as stops to limit rotation of doors 142 about the hinge formed by connectors 150 and hooks 149 to about 45 degrees. Modesty panel 230 also includes door retension brackets 154 which are connected at one end to web 146 and include a retainer element 156 at the other end which engages a retainer element 158 on access door 142 to retain door 142 in the raised or closed position shown in FIGS. 13 and 14. Retainer elements 156 and 158 can, for example, be loop and hook (e.g. Velcro®) type elements, snap fasteners, or one of the elements could be a magnet and the other a ferromagnetic material. Retension brackets 154 may extend along the entire length of panel 230 or a plurality of brackets 154 which are spaced apart along the length of panel 230 may also be used. Cable access flap 140 is preferably a flexible flap mounted to the lower end of panel 206. Flaps 140 provide a continuous closure between panels 206, and access doors 142 to conceal brackets 154 and the interior of modesty panel 230.

While I-beam shaped member 40 is primarily intended for use on the underside of a worksurface, member 40 can be mounted to a variety of support surfaces in generally any orientation. For example, member 40 can be mounted to the upper side of a worksurface to provide a table top or desk top powerway.

The I-beam member 40, power modules 24, receptacles 16, removable panels 106 or 206, troughs 12, and modesty panels 20, 130 or 230 may be easily installed to a worksurface at a furniture manufacturing facility, at a distributor or retail establishment, or at the point of use, and can be easily installed either on new furniture or retrofitted to generally any existing support surface. The I-beam member 40, power modules 24, receptacles 16, removable panels 106 or 206, trough 12 and modesty panels 20, 130 or 230 can be utilized, as desired, in a multiplicity of different configurations. For example, member 40 can be used with none, one or two troughs 12, either with or without a modesty panel 20, 130 or 230, with none, one or two removable panels 106 or 206, and with or without one or more power modules 24 and receptacles 16.

I-beam shaped member 40 and the various attachments 16, 24, 106 or 206, 12, 20, 130 or 230 can be easily mounted, demounted and remounted, as desired, without tools or additional fastening elements such as screws or bolts. Use of member 40 and panels 106 or 206 in combination with troughs 12, modesty panel 130 or 230, or both troughs 12 and modesty panel 130 or 230 provides separate routing cavities for power systems and voice/data cabling. In configurations utilizing modesty panels 130 or 230 which include internal wireways, at least 5 inches of separation can be provided between the powerway (modules 24 installed on member 40) and communication cables (voice or data) disposed in panels 130 or 230, with a metal barrier (flange 52) disposed between the powerway and the communication cables, whereby compliance with Electronics Industry Association (EIA) standards and Telecommunication Industry Association (TIA) standards relating to isolation of communication cables from powerways may be achieved.

The invention may be used to provide electrical and voice/data connections between a series of mechanically linked tables, desks or the like; allows a plurality of linked tables to be powered and/or voice/data wiring via a single power and/or voice/data feed. The invention also allows concealment of excess appliance cord, communication cord, computer cables, and the like.

The embodiments of the invention in which an exclusive property or privilege is claimed are defined as follows:

1. A modular wireway dependently supported from an underside of a worksurface comprising:

an elongate member depending from the underside of the worksurface, a modesty panel dependently attached to the elongate member, the elongate member including at least one connector mating with a connector on a removably attached cable management trough, the at least one connector being configured to allow attachment of the trough to the elongate member without tools or auxiliary fasteners, the elongate member including a modesty panel connector engaging a mating connector on the dependently attached modesty panel.

2. The modular wireway of claim 1, wherein the at least one connector is configured for rigidly connecting the cable management trough to the elongate member.

3. The modular wireway of claim 1, wherein the elongate member further comprises at least one retainer for removably supporting at least one closure on the elongate member to define an enclosed raceway, the retainer being configured to allow attachment of the closure to the elongate member without tools or auxiliary fasteners.

4. The modular wireway of claim 1, wherein the modesty panel includes a raceway having a bottom and side walls, the upper ends of the side walls of the raceway being vertically spaced away from the elongate member, whereby cables can be layed into the raceway.

5. The modular wireway of claim 1, wherein the elongate member has a generally I-shaped transverse cross-section and includes an upper horizontal flange member configured to be mounted on a support bracket secured to the worksurface, a web which depends from the upper horizontal flange member, and a lower attachment flange connected to the lower end of the web.

6. The modular wireway of claim 5, wherein the attachment flange has at least two connectors, including at least one connector configured for rigidly connecting the cable management trough to the elongate member, and at least one connector configured for hingedly connecting the cable management trough to the elongate member.

7. A modular wireway dependently supportable from an underside of a support surface of an article of furniture comprising:

an elongate member which is configured to be dependently mountable to the underside of the support surface, the elongate member including at least one connector for mating with a connector on a removably attachable cable management trough, the at least one connector being configured to allow attachment of the trough to the elongate member without tools or auxiliary fasteners, wherein the at least one connector is configured for hingedly connecting the cable management trough to the elongate member.

8. A modular wireway dependently supportable from an underside of a support surface of an article of furniture comprising:

an elongate member which is configured to be dependently mountable to the underside of the support surface, the elongate member including at least one connector for mating with a connector on a removably attachable cable management trough, the at least one connector being configured to allow attachment of the trough to the elongate member without tools or auxiliary fasteners, wherein the elongate member includes at least two connectors, including at least one connector configured for rigidly connecting the cable management trough to the elongate member, and at least one connector configured for hingedly connecting the cable management trough to the elongate member.

9. A modular wireway comprising:

an elongate member which is mountable to a support surface, the elongate member including at least one connector for mating with a connector on an attachable cable management trough, the at least one connector being configured to allow attachment of the trough to the elongate member without tools or auxiliary fasteners, the elongate member further comprising a modesty panel connector, the modesty panel connector being configured to allow attachment of a modesty panel to the elongate member without tools or auxiliary fasteners, and a modesty panel having a mating connector configured to engage the modesty panel connector on the elongate member, the modesty panel being dependently attached to the elongate member, the modesty panel including a raceway having a bottom, and at least one side access door which is hingedly connected to the raceway.

10. The modular wireway of claim 9, wherein the access door includes a connector for detachably and hingedly connecting the access door to the modesty panel without tools or auxiliary fasteners.

11. A modular wireway dependently supported from an underside of a worksurface comprising:

an elongate member depending from the underside of the worksurface, a modesty panel dependently and removably supported from the elongate member, the elongate member including a modesty panel connector engaging a mating connector on the dependently, removably attached modesty panel, and at least one retainer supporting at least one closure on the elongate member to define an enclosed raceway, wherein the elongate member has a generally I-shaped transverse cross-section and includes an upper horizontal flange member configured to be mounted on a support bracket secured to the worksurface, a web which depends from the upper horizontal flange member, and a lower attachment flange connected to the lower end of the web.

12. The modular wireway of claim 11, wherein the modesty panel connector is configured to allow attachment of the modesty panel to elongate member without tools or auxiliary fasteners.

13. The modular wireway of claim 11, wherein the retainer is configured to allow attachment of the closure to the elongate member without tools or auxiliary fasteners.

14. The modular wireway of claim 11, wherein the elongate member further comprises at least one trough connector for mating with a connector on an attachable cable management trough.

15. The modular wireway of claim 14, wherein the trough connector is configured to allow attachment of the cable management trough to the elongate member without tools or auxiliary fasteners.

16. The modular wireway of claim 11, wherein the modesty panel includes a raceway having a bottom and side walls, the upper ends of the side walls of the raceway being vertically spaced away from the elongate member, whereby cables can be layed into the raceway.

17. A modular wireway comprising:

an elongate member which is mountable to a support surface, the elongate member including a modesty panel connector for engaging a mating connector on a dependently attachable modesty panel, and at least one retainer for supporting at least one closure on the elongate member to define an enclosed raceway; and a modesty panel having a mating connector configured to engage the modesty panel connector on the elongate member, the modesty panel being dependently attached to the elongate member, the modesty panel including a raceway having a bottom, and at least one side access door which is hingedly connected to the raceway.

18. The modular wireway of claim 17, wherein the access door includes a connector for detachably and hingedly connecting the access door to the modesty panel without tools or auxiliary fasteners.

19. A modular wireway dependently supported from the underside of a worksurface comprising:
an elongate member dependently mounted to the underside of the worksurface, the elongate member including at least one connector mating with a connector on a cable management trough, whereby the cable management trough is removably mounted to the elongate member; and
a modesty panel removably attached to the elongate member, the modesty panel including a raceway having a bottom and sidewalls, the upper ends of the sidewalls of the raceway being vertically spaced apart from the elongate member, whereby cable can be laid into the raceway.

20. The modular wireway of claim 19, wherein the elongate member further comprises a modesty panel connector and the modesty panel includes a mating connector which is engaged with the modesty panel connector to removably attach the modesty panel to the elongate member.

21. The modular wireway of claim 20, wherein the modesty panel connector and mating connector are configured to allow attachment of the modesty panel to the elongate member without tools or auxiliary fasteners.

22. The modular wireway of claim 19, wherein the elongate member has a generally I-shaped transverse cross-section and includes an upper horizontal flange member configured to be mounted on a support bracket secured to the worksurface, a web which depends from the upper horizontal flange member, and a lower attachment flange connected to the lower end of the web.

23. A modular wireway comprising:
an elongate member which is mountable to a support surface, the elongate member including at least one connector for mating with a connector on an attachable cable management trough; and
a modesty panel removably attached to the elongate member, the modesty panel including a raceway having a bottom, and at least one side access door which is hingedly connected to the raceway.

24. An article of furniture comprising:
a worksurface;
an elongate member dependently mounted to an underside of the worksurface, the elongate member including at least one connector mating with a connector on a cable management trough, whereby the cable management trough is removably attached to the elongate member, the at least one connector being configured to allow attachment of the trough to the elongate member without tools or auxiliary fasteners; and
a modesty panel removably attached to the elongate member, the modesty panel including a raceway having a bottom and sidewalls, the upper ends of the sidewalls of the raceway being vertically spaced away from the elongate member, whereby cables can be laid into the raceway.

25. The article of furniture of claim 24, further comprising a pop-up grommet extending through the worksurface to allow one or more cables to be passed from the upper side of the worksurface, through the grommet, and to an electrical receptacle mounted on the elongate member.

26. An article of furniture comprising:
a worksurface;
an elongate member mounted to the worksurface, the elongate member including at least one connector for mating with a connector on a removably attachable cable management trough, the at least one connector being configured to allow attachment of the trough to the elongate member without tools or auxiliary fasteners; and
a modesty panel removably attached to the elongate member, the modesty panel including a raceway having a bottom, and at least one side access door which is hingedly connected to the raceway.

27. An article of furniture comprising:
a worksurface; and
an elongate member mounted to the worksurface, the elongate member including at least one connector for mating with a connector on an attachable cable management trough, the at least one connector being configured to allow attachment of the trough to the elongate member without tools or auxiliary fasteners, the elongate member having a generally I-shaped transverse cross-section and including an upper horizontal flange member configured to be mounted on a support bracket secured to a support surface, a web which depends from the upper horizontal flange member, and a lower attachment flange connected to the lower end of the web.

28. An article of furniture comprising:
a worksurface;
an elongate member mounted to the worksurface, the elongate member including a modesty panel connector for engaging a mating connector on an attachable modesty panel, and at least one retainer for supporting at least one closure on the elongate member to define an enclosed raceway; and
a modesty panel removably attached to the elongate member, the modesty panel including a raceway having a bottom, and at least one side access door which is hingedly connected to the raceway.

29. An article of furniture comprising:
a worksurface; and
an elongate member mounted to the worksurface, the elongate member including a modesty panel connector for engaging a mating connector on an attachable modesty panel, and at least one retainer for supporting at least one closure on the elongate member to define an enclosed raceway, the elongate member having a generally I-shaped transverse cross-section and including an upper horizontal flange member configured to be mounted on a support bracket secured to a support surface, a web which depends from the horizontal flange member, and a lower attachment flange connected to the lower end of the web.

30. A modular power and cable distribution system dependently supported from the underside of a worksurface of an article of furniture comprising:
an elongate member having a top flange dependently supported from the worksurface, a vertical web extending downwardly from the top flange, and a bottom flange, the bottom flange including a connector supporting at least one of a trough mounted laterally adjacent to the elongate member, a closure panel which together with the elongate member defines an enclosed powerway, and a modesty panel dependently supported from the elongate member.

* * * * *

UNITED STATES PATENT AND TRADEMARK OFFICE
CERTIFICATE OF CORRECTION

PATENT NO. : 5,971,508
DATED : October 26, 1999
INVENTOR(S) : Deimen, et al

It is certified that error appears in the above-identified patent and that said Letters Patent is hereby corrected as shown below:

Abstract, line 19:

Delete "invention";

Column 3, line 32:

Delete ", as" insert - -is- -;

Column 7, line 32:

"addition" should be - -additional- -;

Column 7, line 41:

"layed" should be - -laid- -;

Column 9, claim 4, line 22:

"layed" should be - -laid- -;

UNITED STATES PATENT AND TRADEMARK OFFICE
CERTIFICATE OF CORRECTION

PATENT NO. : 5,971,508
DATED : October 26, 1999
INVENTOR(S) : Deimen, et al

It is certified that error appears in the above-identified patent and that said Letters Patent is hereby corrected as shown below:

Column 10, claim 12, line 37:
    Before "elongate" insert - -the- -;

Column 10, claim 16, line 54:
    "layed" should be - -laid- -;

Signed and Sealed this

Twentieth Day of June, 2000

Attest:

Q. TODD DICKINSON

*Attesting Officer*      *Director of Patents and Trademarks*